US010641154B2

(12) United States Patent
Cremeens et al.

(10) Patent No.: US 10,641,154 B2
(45) Date of Patent: May 5, 2020

(54) PARTICULATE MATTER SENSOR WITH ENGINEERED PARTICLE SIZE CUT-POINT

(71) Applicant: Cummins Emission Solutions Inc., Columbus, IN (US)

(72) Inventors: Christopher M. Cremeens, McFarland, WI (US); Aleksey Yezerets, Columbus, IN (US); Reshma Prattipati, Clinton Township, MI (US); Michael A. Robinson, Boulder, CO (US)

(73) Assignee: Cummins Emission Solutions Inc., Columbus, IN (US)

( * ) Notice: Subject to any disclaimer, the term of this patent is extended or adjusted under 35 U.S.C. 154(b) by 38 days.

(21) Appl. No.: 15/755,292

(22) PCT Filed: Aug. 27, 2015

(86) PCT No.: PCT/US2015/047243
§ 371 (c)(1),
(2) Date: Feb. 26, 2018

(87) PCT Pub. No.: WO2017/034583
PCT Pub. Date: Mar. 2, 2017

(65) Prior Publication Data
US 2018/0245499 A1    Aug. 30, 2018

(51) Int. Cl.
*F01N 11/00*      (2006.01)
*F01N 3/021*      (2006.01)
(Continued)

(52) U.S. Cl.
CPC .......... *F01N 11/00* (2013.01); *B01D 46/0086* (2013.01); *B01D 46/44* (2013.01);
(Continued)

(58) Field of Classification Search
CPC ............. F01N 2550/04; F01N 2560/05; F01N 2900/0416; F01N 2900/1606;
(Continued)

(56) References Cited

U.S. PATENT DOCUMENTS 6,538,345 B1    3/2003  Maller
7,178,328 B2    2/2007  Solbrig
(Continued)

FOREIGN PATENT DOCUMENTS

EP      2 199 553 A1    6/2010
KR      101399049       5/2014

OTHER PUBLICATIONS

Final Office Action on U.S. Appl. No. 15/190,882 dated Jan. 31, 2019.
(Continued)

*Primary Examiner* — Jonathan R Matthias
(74) *Attorney, Agent, or Firm* — Foley & Lardner LLP (57) ABSTRACT

An aftertreatment system comprises a particulate filter configured to filter PM possessing a predetermined, least effective size range included in an exhaust gas flowing through the aftertreatment system. A PM sensor assembly is positioned downstream of the particulate filter and includes a housing having an inlet, an outlet, a sidewall and defines an internal volume. A PM sensor is positioned within the internal volume. The housing is configured to redirect a flow of exhaust gas entering the PM sensor assembly around the PM sensor so that small particles included in the exhaust gas flow having a first size within or smaller than the predetermined size range are directed around the particulate matter sensor. Large particles having a second size larger than the predetermined size range impact the PM sensor. A controller is communicatively coupled to the PM sensor.

23 Claims, 6 Drawing Sheets

(51) Int. Cl.
   *G01N 1/22* (2006.01)
   *G01N 15/06* (2006.01)
   *B01D 46/44* (2006.01)
   *B01D 46/00* (2006.01)
   *G01N 15/08* (2006.01)
   *G07C 5/08* (2006.01)
   *G01N 15/00* (2006.01)
   *G01N 15/02* (2006.01)

(52) U.S. Cl.
   CPC ......... *B01D 46/442* (2013.01); *B01D 46/446* (2013.01); *F01N 3/021* (2013.01); *G01N 1/2252* (2013.01); *G01N 15/0656* (2013.01); *G01N 15/0826* (2013.01); *G07C 5/0825* (2013.01); *B01D 2279/30* (2013.01); *F01N 2550/00* (2013.01); *F01N 2550/04* (2013.01); *F01N 2560/05* (2013.01); *G01N 15/0255* (2013.01); *G01N 15/0606* (2013.01); *G01N 2015/0046* (2013.01); *G01N 2015/0261* (2013.01); *G01N 2015/084* (2013.01); *Y02T 10/20* (2013.01); *Y02T 10/47* (2013.01)

(58) Field of Classification Search
   CPC ........... B01D 46/0086; G01N 15/0606; G01N 15/0618; G01N 15/0643; G01N 2015/084
   See application file for complete search history.

(56) References Cited

U.S. PATENT DOCUMENTS

| | | | |
|---|---|---|---|
| 7,254,212 B2 | 8/2007 | Saitoh et al. | |
| 7,485,272 B2 | 2/2009 | Driscoll et al. | |
| 7,549,317 B2 | 6/2009 | Rhodes et al. | |
| 7,739,898 B2 | 6/2010 | Shaddock et al. | |
| 7,963,143 B2 | 6/2011 | Baumann et al. | |
| 8,030,086 B2 | 10/2011 | Schmidt et al. | |
| 8,161,796 B2 | 4/2012 | Nair et al. | |
| 8,249,827 B2 | 8/2012 | Nelson et al. | |
| 8,256,307 B2 | 9/2012 | Graze et al. | |
| 8,490,465 B2 | 7/2013 | Ante et al. | |
| 2006/0049346 A1* | 3/2006 | McGann | G01N 1/2208 250/287 |
| 2009/0035195 A1 | 2/2009 | Robel | |
| 2011/0314796 A1 | 12/2011 | Nakamura et al. | |
| 2012/0016227 A1 | 1/2012 | Deshmukh | |
| 2012/0047875 A1 | 3/2012 | Hamama et al. | |
| 2012/0186227 A1 | 7/2012 | Yacoub et al. | |
| 2014/0360168 A1 | 12/2014 | Broderick et al. | |
| 2015/0093315 A1 | 4/2015 | Broderick et al. | |
| 2016/0160725 A1 | 6/2016 | Hudgens et al. | |
| 2016/0223432 A1* | 8/2016 | Kubinski | F01N 3/027 |

OTHER PUBLICATIONS

Non-Final Office Action on U.S. Appl. No. 15/190,882 dated Jul. 13, 2018.

International Search Report and Written Opinion for PCT/US2015/047243, dated Nov. 23, 2015, 10 pages.

Non-Final Office Action issued for U.S. Appl. No. 15/190,882, dated May 28, 2019, 37 pages.

CN Office Action from Application No. CN 201580082606.7, dated, Sep. 4, 2019, pp. 1-8.

* cited by examiner

PARTICULATE MATTER SENSOR WITH ENGINEERED PARTICLE SIZE CUT-POINT

CROSS-REFERENCE TO RELATED APPLICATIONS

The present application is a National Stage of PCT Application No. PCT/US2015/047243, filed Aug. 27, 2015, the contents of which are incorporated herein by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and the $NO_2$ in some fraction) into harmless nitrogen gas ($N_2$) and water vapor ($H_2O$) in the presence of ammonia ($NH_3$).

Many aftertreatment systems include a particulate filter (e.g., a diesel particulate filter [DPF]) positioned upstream of the SCR system. The particulate filter is configured to filter particulate matter (PM), for example soot entrained within the exhaust gas flowing through the aftertreatment system to meet PM emissions regulations. Generally, particulate filters have a very high mass filtration efficiency (99.9%). Particulate filters are generally configured to filter particles of a size smaller than about 100 nm very effectively by diffusion processes and also filter particles of a size larger than about 300 nm are very effectively by impaction and interception. However, there is a known phenomenon sometimes referred to as "the Greenfield Gap," where particles falling within this size range (i.e., between 100-300 nm) are filtered at a much reduced efficiency. As such, particles that are not filtered by a particulate filter can be thought of as effectively "size selected".

Exhaust emission regulations require monitoring of the particulate filter to ensure that the particulate matter emissions meet regulation standards. While an amount of particles having a size within the least efficient size range might pass through the particulate filter, the amount is generally sufficiently small such that total PM emissions remain within the emission standards for a properly functioning particulate filter. However, catastrophic failure of the particulate filter, for example a crack or break in the particulate filter, can provide a relatively uninhibited flow path for the PM to flow to through the particulate filter to the downstream aftertreatment components (e.g., the SCR system) and into the environment. In such a scenario, the large particles having a size above the Greenfield gap size range, which are normally intercepted by the particulate filter, also pass through the filter and significantly increase the PM emissions.

SUMMARY

Embodiments described herein relate generally to systems and methods of detecting a failure of a particulate filter of an aftertreatment system using a PM sensor assembly. In various embodiments, systems and methods described herein include a PM sensor assembly which includes a PM sensor positioned within a housing. The housing is configured to redirect a flow of exhaust gas entering the housing such that only large particles having a size greater than a predetermined size range, which correspond to a least effective filtering size range of the particulate filter, impact and accumulate on the PM sensor. The accumulation causes a change in an electrical parameter of the PM sensor indicating a failure of the particulate filter.

In a first set of embodiments, an aftertreatment system comprises a particulate filter configured to filter PM possessing a predetermined size range which are included in an exhaust gas flowing through the aftertreatment system. A PM sensor assembly is positioned downstream of the particulate filter. The PM sensor assembly includes a housing having an inlet, an outlet and a sidewall. The housing defines an internal volume. A PM sensor is positioned within the internal volume. The PM sensor assembly is positioned within a flow path of the exhaust gas so that a portion of the exhaust gas enters the internal volume of the housing via the inlet. The housing is configured to redirect the flow of the portion of the exhaust gas around the PM sensor such that small particles included in the portion of the exhaust gas flow having a first size within or smaller than the predetermined size range are directed around the particulate matter sensor. Moreover, large particles having a second size larger than the predetermined size range impact the PM sensor. A controller is communicatively coupled to the PM sensor.

In another set of embodiments, a PM sensor assembly for use in an aftertreatment system comprises a housing having an inlet, an outlet and a sidewall. The housing defines an internal volume. A PM sensor is positioned within the internal volume. The housing is configured to redirect an exhaust gas flow entering through the inlet around the PM sensor such that small particles included in the exhaust gas flow having a first size within or smaller than a predetermined size range are directed around the particulate matter sensor. Moreover, large particles having a second size larger than the predetermined size range impact the particulate matter sensor.

In yet another set of embodiments, a method for determining a failure of a particulate filter configured to filter PM possessing a predetermined size range, which is included in an aftertreatment system including a PM sensor assembly positioned downstream of the particulate filter. The PM sensor assembly comprises a housing having an inlet, an outlet and a sidewall, and a particulate matter sensor is positioned within an internal volume defined by the housing. The method comprises flowing an exhaust gas through the aftertreatment system so that a portion of the exhaust gas flows into the housing via the inlet after flowing through the particulate filter. The housing is configured to redirect the flow of the portion of the exhaust gas to flow around the PM sensor such that small particles included in the portion of the exhaust gas flow having a first size within or smaller than the predetermined size range are directed around the PM sensor, and large particles having a second size larger than the predetermined size range impact the PM sensor.

The method interprets a first electrical parameter value of the PM sensor. The exhaust gas is allowed to flow through the PM sensor assembly for a predetermined time enabling the large particles to accumulate on the PM sensor. The method interprets a second electrical parameter value of the PM sensor. It is determined if a difference between the second electrical parameter value and the first electrical parameter value is greater than a predetermined threshold. If the difference is determined to be greater than the predetermined threshold, a failure of the particulate filter is determined, and the failure of the particulate filter is indicated to a user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of detecting a failure of a particulate filter of an aftertreatment system using a PM sensor assembly. In various embodiments, systems and methods described herein include a PM sensor assembly which includes a PM sensor positioned within a housing. The housing is configured to redirect a flow of exhaust gas entering the housing such that only large particles having a size greater than a predetermined size range, which correspond to a least effective filtering size range of the particulate filter, impact and accumulate on the PM sensor. The accumulation causes a change in an electrical parameter of the PM sensor indicating a failure of the particulate filter.

Conventional aftertreatment systems generally include a PM sensor positioned downstream of a particulate filter (e.g., the particulate filter 110 of FIG. 1) in the flow path of the exhaust gas. The PM sensor generally include an accumulation-type sensor which allows particles included in the PM entrained in the exhaust gas flow downstream of the particulate filter to accumulate on a sensing portion of the PM sensor. Accumulation of the particles on the sensing portion of such PM sensors changes an electrical parameter (e.g., resistance, conductance and/or capacitance) of the PM sensor. Such PM sensors are periodically regenerated, for example by raising the temperature of the PM sensor to oxidize the PM and return to its initial state. The time it takes to accumulate and return to the initial state is used to determine the amount of PM entrained in the exhaust gas flow.

While regeneration removes the organic matter, metallic and/or oxide particles included in the PM (which can, for example have a size in the range of 20-40 nm) also accumulate on the PM sensor. Such particles can generally are difficult to remove from the PM sensor and lead to eventual degradation and malfunction of the PM sensor. Since these metallic oxides are agglomerated with the PM that passes through a particulate filter under normal operation, this degradation is inevitable.

In situations where the particulate filter fails, for example due to cracks or breaks, at least a portion of the exhaust gas flow passes through the particulate filter uninhibited (i.e., unfiltered). This allows a large amount of large particles (i.e., having a diameter greater than a predetermined size range e.g., 100 nm to 300 nm), small particles (i.e., having a size within the predetermined size range e.g., between 100 nm and 300 nm), and the metallic and/or oxide particles, which can have a diameter smaller than the predetermined size range (e.g., less than 100 nm) included in the exhaust gas to flow through the particulate filter flow and accumulate rapidly on the PM sensor. The fast accumulation of particulate matter on the PM sensor reduces the time to reach a regeneration threshold and to return the PM sensor to its initial state. This leads to an indication of malfunction of the particulate filter.

Embodiments of the systems and methods for detecting a failure of a particulate filter using a PM sensor assembly may provide benefits including, for example: (1) providing a housing or enclosure within which the PM sensor is disposed, and which is configured to redirect an exhaust gas flow entering the housing so that small particles flow around the PM sensor and only large particles impact the PM sensor; (2) using changes in an electrical parameter such as resistance, conductance and/or capacitance of the PM sensor to determine presence of large particles which indicate a failure of the particulate filter; (3) reducing impaction and accumulation of particles normally entrained in the exhaust gas flow downstream of a properly functioning particulate filter on the PM sensor, thereby extending the life of the PM sensor; and (4) allowing use of existing accumulation-type PM sensors in the PM sensor assembly, thereby reducing manufacturing and maintenance costs.

Figure 1:
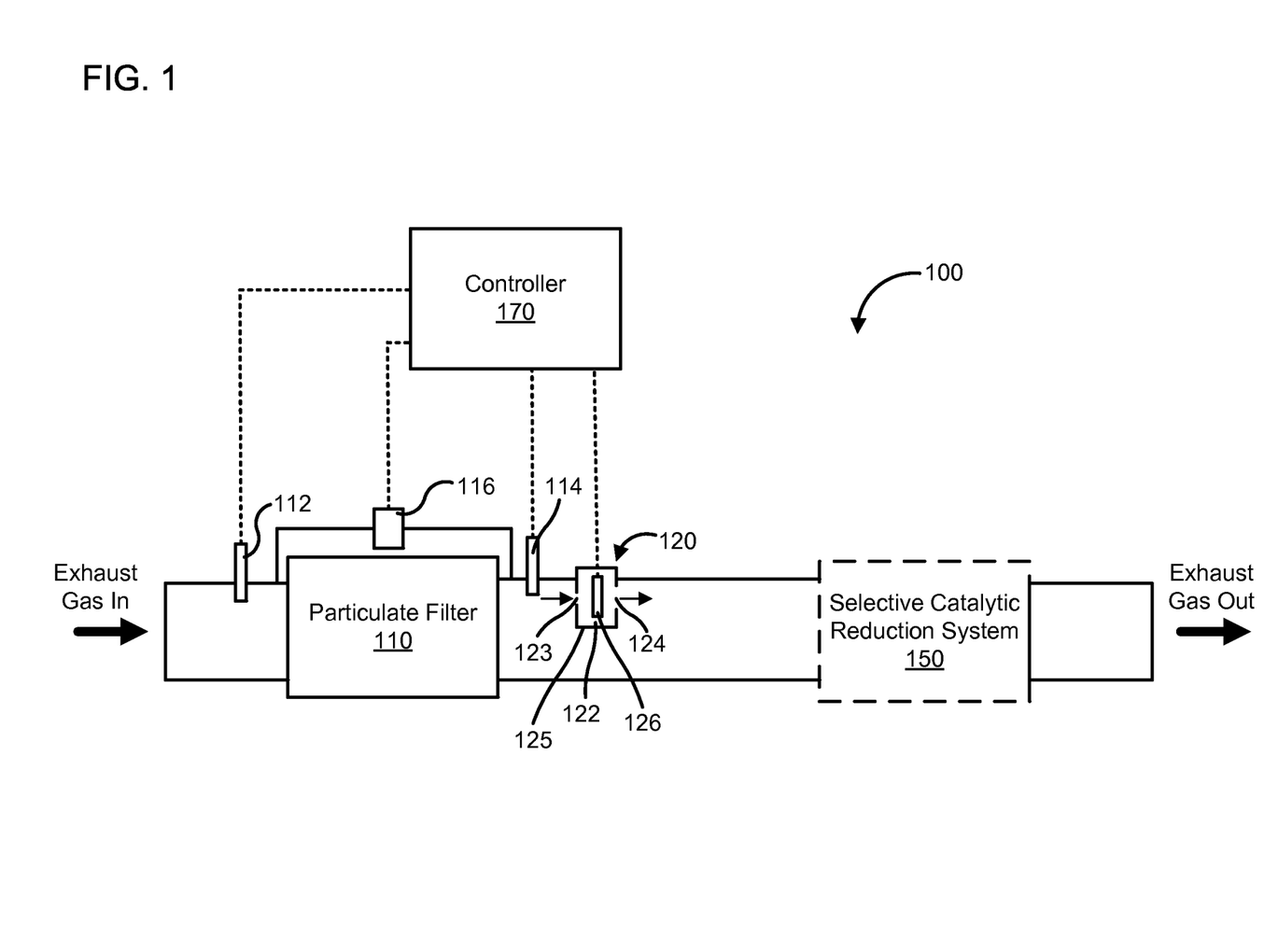
FIG. 1 is a schematic block diagram of an aftertreatment system that includes a particulate filter and a PM sensor assembly positioned downstream of the particulate filter.

FIG. 1 is a schematic block diagram of an aftertreatment system 100 according to an embodiment. The aftertreatment system 100 includes a particulate filter 110, a PM sensor assembly 120, a controller 170 and optionally, a SCR system 150, one or more of a first pressure sensor 112, a second pressure sensor 114 and a differential pressure sensor 116.

The particulate filter 110 is configured to receive an exhaust gas (e.g., a diesel exhaust gas) from an engine (e.g., an IC engine) and filter the PM from the exhaust gas. In some embodiments, in which the exhaust gas includes a diesel exhaust gas, the particulate filter 110 includes a diesel particulate filter. The particulate filter 110 can include any suitable filter configured to filter and remove any PM entrained within the exhaust gas flow, such that the exhaust gas expelled into the environment meets emissions regulations. Such PM can include, for example, soot, organic particles, metallic oxides, condensed semi-volatile compounds, or any other solid particulates present in the exhaust gas.

The particulate filter 110 is configured to filter PM very efficiently below and above a predetermined size range which can correspond to the Greenfield Gap (e.g., in the range of 100-300 nm). Small particles, for example particles having a size range less than 100 nm included in the PM are filtered very effectively (e.g., at a filtration efficiency of 99.9%) by a filter element (not shown) of the particulate filter 110 through a combination of diffusion and interception of the particles. Furthermore, large particles, for example particles having a size range larger than 300 nm included in the PM are also filtered very effectively (e.g., at a filtration efficiency of 99.9%) via interception. However, the particulate filter has the lowest efficiency for filtering particles that fall within the predetermined size range. These "size selected" particles have a higher probability of flowing through the particulate filter 110 and flowing into the PM sensor assembly 120 positioned downstream of the particulate filter 110.

Any suitable filter element can be used in the particulate filter 110 such as, for example, cordierite or silicon carbide filter element, any other suitable filter element or a combination thereof. The filter element can have any suitable pore size, for example, about 10 microns, about 5 microns, or about 1 micron. In particular embodiments, the particulate filter 110 can be catalyzed.

The exhaust gas has a first pressure upstream of the particulate filter 110. As the exhaust gas flows through the particulate filter 110, the exhaust gas experiences a drop in pressure such that the exhaust gas has a second pressure downstream of the particulate filter 110. The drop in pressure correlates to the filtering condition of the particulate filter 110. A fresh or new particulate filter 110 will offer minimal resistance to the flow of the exhaust gas. As the particulate filter 110 traps particulate matter from the exhaust gas, the amount of particulate matter in the particulate filter 110 increases over time, and the particulate filter gets increasingly clogged. This leads to an increase in the back pressure exerted by the particulate filter 110 on the exhaust gas over time.

In particular embodiments, a first pressure sensor 112 is positioned upstream of the particulate filter 110 and is configured to measure the first pressure upstream of the particulate filter 110. A second pressure sensor 114 is positioned downstream of the particulate filter 110 and is configured to measure the second pressure downstream of the particulate filter 110. A differential pressure sensor 116 can also be positioned across the particulate filter 110 exclusively, or in addition to, the first pressure sensor 112 and the second pressure sensor 114. The differential pressure sensor 116 is configured to determine a differential pressure across the particulate filter 110. The differential pressure sensor 116 is also indicative of the filtering condition of the particulate filter 110. The pressure difference or differential pressure is used to determine a filtering condition or a filter loading of the particulate filter 110.

The resistance to the flow of exhaust gas increases through the particulate filter 110 over time, which correlates to an increasing difference in pressure between the first pressure and the second pressure. In this manner, the difference between the first pressure and the second pressure can be used to determine the filtering condition of the first particulate filter 110 and determine when the first particulate filter 110 needs to be changed or regenerated.

While the pressure difference across the particulate filter 110 is indicative of the filtering condition, for example filter loading of the particulate filter 110, catastrophic failure of the particulate filter 110 is difficult to detect from the pressure difference. Such a failure of the particulate filter 110 can include physical cracking or breaking of the particulate filter 110 or otherwise the filter element included in the particulate filter 110. In such a scenario, at least a portion of the exhaust gas flows through the cracks or breaks in the particulate filter 110 relatively uninhibited compared to the intact particulate filter 110. Thus, there is no significant pressure drop across the particulate filter 110 and no indication is available by just pressure monitoring that the particulate filter 110 has failed (i.e., cracked or broken). Large particles (i.e., having a size range greater than the predetermined size range e.g., greater than 300 nm), which are normally prevented from passing through the particulate filter 110, can then flow through the failed particulate filter 110 via the cracks with the exhaust gas flow.

The PM sensor assembly 120 is positioned downstream of the particulate filter 110. The PM sensor assembly 120 includes a housing 122 having an inlet 123, and outlet 124 and a sidewall 125. The housing 122 defines an internal volume. A PM sensor 126 is positioned within the internal volume defined by the housing 122. The PM sensor 126 can be positioned such that a sensing portion of the PM sensor 126 is oriented orthogonal to a longitudinal axis of the PM sensor assembly 120.

For example, the PM sensor 126 can include a flat sensor that includes a first flat surface and a second flat surface opposite the first flat surface. One or more sensors can be positioned or defined on the first flat surface of the PM sensor 126. The PM sensor 126 is positioned such that the first flat surface, which includes the one or more sensors positioned thereon, is oriented orthogonal to the longitudinal axis of the PM sensor assembly 120. For example, the first flat surface of the PM sensor 126 can be oriented at an angle of 75 degrees, 80 degrees, 85 degrees, 90 degrees, 95 degrees, 100 degrees or 105 degrees with respect to the longitudinal axis of the PM sensor assembly 120, inclusive of all ranges and values therebetween.

The one or more sensors included in the PM sensor 126 can include resistance sensors, conductance sensors and/or capacitance sensors. In particular embodiments, the one or more sensors can include interdigitated electrodes. The PM sensor 126 can include an accumulation-type sensor. The PM sensor 126 is configured to generate an output value indicative of a electrical parameter value (e.g., a resistance value, a conductance value or a capacitance value) which changes as PM accumulates on the surface of the PM sensor 126 (e.g., the first flat surface). The change in the electrical parameter value is used to determine failure of the particulate filter 110, as described in further detail below.

The PM sensor assembly 120 is positioned within a flow path of the exhaust gas so that a portion of the exhaust gas enters the internal volume of the housing 122 via the inlet 123. The housing 122 is configured to redirect the flow of the portion of the exhaust gas around the PM sensor 126 so that small particles included in the portion of the exhaust which have a first size within or smaller than the predetermined size range (e.g., 100 nm to 300 nm) are directed around the PM sensor 126. Moreover, the large particles having a second size larger than the predetermined size range (e.g., larger than 300 nm) leave the exhaust gas flow and impact the PM sensor 126.

Expanding further, the inlet 123 of the housing 122 can include an orifice having a diameter or otherwise cross-section and shape which accelerates the portion of the exhaust gas flow into the internal volume of the housing 122. The sudden change in pressure as the exhaust gas accelerates into the internal volume changes the direction of the exhaust gas around the PM sensor 126. Furthermore, the flat PM sensor 126 positioned within the flow path of the exhaust gas serves as an impaction plate which changes the direction of the flow of the exhaust gas in the range of 75 degrees to 90 degrees. The portion of the exhaust gas flows parallel to the PM sensor 126 and is redirected around the PM sensor 126. In particular embodiments, the sidewall 125 of the housing 122 is shaped to facilitate redirection of the portion of the exhaust gas around the PM sensor 126. For example, the sidewall 125 of the housing 122 can be arcuate, for example define a semi-circular shape, semi-hemispherical or a semi-elliptical shape.

In one embodiment, the inlet 123 has a first cross-section (e.g., diameter) and the outlet 124 has a second cross-section (e.g., diameter) which is larger than the first cross-section. The larger second cross-section allows a less restricted flow path of for the portion of the exhaust gas to exit the housing 122 to join the bulk exhaust gas flow, which can also facilitate redirection of the exhaust gas around the PM sensor 126.

As the flow of the portion of the exhaust gas is redirected around the PM sensor 126, the small particles which have low inertia remain entrained within the exhaust gas flow stream and are redirected around the PM sensor 126. However, large particles included in the exhaust gas stream which have a higher inertia relative to the small particles leave the exhaust gas flow stream and impact the PM sensor 126. As the large particles accumulate on the PM sensor 126, this causes a change in the electrical parameter value of the PM sensor 126 which is indicative of the impaction and accumulation of the large particles. Since large particles are present in the exhaust stream only when the particulate filter 110 fails as described above, impact of the large particles on the PM sensor leading to change in the electrical parameter value of the PM sensor 126 also indicates that the particulate filter 110 has failed.

A very small or de minimus quantity of the small particles can also impact the PM sensor 126 during normal operation, i.e., even when the PM sensor 126 has not failed and is working correctly. This can be due to turbulence, vortices and or imperfections in redirection of the portion of the exhaust gas flow. The de minimus quantity of the small particles will also accumulate on the PM sensor 126 over an extended period of time and not all of the small particles, such as metal and oxide particles can be removed via regeneration, as described before. While this also causes a change in electrical parameter value of the PM sensor 126, it is much slower relative to the change in the electrical parameter value due to impaction of the large particles because of a failure of the particulate filter 110.

This small change in the electrical parameter value can be accounted for by taking a baseline first electrical parameter value measurement and taking a second electrical parameter value measurement after a predetermined time (e.g., after 1 minute, 2 minutes, 3 minutes, 4 minutes, 5 minutes, 6 minutes, 7 minutes, 8 minutes, 9 minutes or 10 minutes inclusive of all ranges and values therebetween). If a difference between the second electrical parameter value is greater than the first electrical parameter value by a predetermined threshold, it is determined that large particles are impacting the PM sensor 126 and the particulate filter 110 has failed.

If the difference is less than the predetermined threshold than it is determined that the particulate filter 110 is operating properly. While the de minimus amount of the small particles will still impact the PM sensor 126, the difference between the second electrical parameter value and the first electrical parameter value will be lower than the predetermined threshold. In some embodiments, if the failure of the particulate filter 110 is not detected, the PM sensor 126 is regenerated after the second electrical parameter value measurement to return the PM sensor electrical parameter output value to the first electrical parameter value for a subsequent measurement.

The electrical parameter value of the PM sensor 126 may not completely return to the first electrical parameter value (e.g., return to within 95%, 96%, 97%, 98% or 99% of the first electrical parameter value) even after regeneration due to the accumulation of metal and oxide particles which cannot be removed. However, this is accounted for by taking the next electrical parameter value measurement after regeneration as the baseline measurement and comparing the difference between the next measurement and a subsequent measurement after the next measurement with the predetermined threshold. In other embodiments, the PM sensor 126 is regenerated after a set number (e.g., 3, 4, 5, 6, 7, 8, 9, 10 or even higher) of electrical parameter output values measurements have been performed by the PM sensor 126. In such embodiments, the second electrical parameter value measurement serves as the baseline measurement for a third electrical parameter value measurement and so on.

The accumulation of the metal and oxide particles over a period of time will change the electrical parameter value (e.g., a resistance value, conductance value or capacitance value) to be greater or smaller than a failure threshold. Under such scenarios the PM sensor 126 is determined to have malfunctioned. This can be indicated to a user so that the PM sensor 126 can be replaced with a new PM sensor 126.

In various embodiments, the aftertreatment system 100 can also include the SCR system 150. FIG. 1 shows the SCR system positioned downstream of the PM sensor assembly 120. In other embodiments, the SCR system 150 or any other SCR system can be positioned upstream of the PM sensor assembly 120. The SCR system 150 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be positioned on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide, and NOx gases.

The aftertreatment system 100 also includes a controller 170. The controller 170 is communicatively coupled to the PM sensor 126 and optionally, the first pressure sensor 112, the second pressure sensor 114 and/or the differential pressure sensor 116. The controller 170 is configured to interpret a first output value from the PM sensor 126 and determine the first electrical parameter value, as described above. After the predetermined time (e.g., after 1 minute, 2 minutes, 3 minutes, 4 minutes, 5 minutes, 6 minutes, 7 minutes, 8 minutes, 9 minutes or 10 minutes inclusive of all ranges and values therebetween) has passed, the controller 170 interprets a second output value from the PM sensor 126 to determine the second electrical parameter value as described herein.

As described above, the first electrical parameter value can be a baseline electrical parameter value of the PM sensor 126. Furthermore, the second electrical parameter value occurs as a result of impact and accumulation of the large particles on the PM sensor 126. The impact and accumulation of the large particles changes the first electrical parameter value to the second electrical parameter value. The controller 170 determines if a difference between the second electrical parameter value and the first electrical parameter value is greater than the predetermined threshold. If it is determined by the controller 170 that the difference is greater than the predetermined threshold, the controller 170 determines that the particulate filter 110 has failed.

The controller 170 indicates the failure of the particulate filter 110 to a user. For example, the aftertreatment system can be included in a system operated by the user (e.g., a vehicle). An audio/visual indication (e.g., an alarm, a beep, a visual indicator on a dashboard, control panel, console, etc.) can be provided to the user to indicate the failure of the particulate filter 110. In some embodiments, a fault code can be generated by a computer system (e.g., an embedded computer) of an engine (e.g., a diesel engine) which is fluidly coupled to the aftertreatment system 100. For example, a check engine light can turn on corresponding to a fault code which indicates that the particulate filter 110 has failed.

In various embodiments, the controller 170 is communicatively coupled to the differential pressure sensor 116 and is further configured to output a differential pressure output value from the differential pressure sensor 116 to determine the differential pressure across the particulate filter 110. Furthermore, the controller 170 can also be configured to interpret a first pressure output from the first pressure sensor 112 and determine the first pressure upstream of the particulate filter 110. The controller 170 also interprets a second pressure output from the second pressure sensor 114 and determines the second pressure downstream of the particulate filter 110. The controller 170 then uses the first pressure and the second pressure to determine a pressure difference across the particulate filter 110.

The controller 170 can include a processor (e.g., a microcontroller) programmed to interpret signals from the PM sensor 126 to determine a failure of the particulate filter 110, as described herein. In some embodiments, the controller 170 can be included in a control module which is in electrical communication with one or more of the components of the aftertreatment system 100 described herein and operable to perform the sensing and control functions described herein. In particular embodiments, the controller 170 can also be configured to also receive and interpret data from temperature sensors, NOx sensors, oxygen sensors and/or ammonia sensors, each of which can be included in the aftertreatment system 100.

The controller 170 can include look up tables, algorithms or instructions, which can be stored on a computer readable medium (CRM) included in the controller 170. The instructions or algorithms on the CRM are executable by a computing device of the controller 170 (e.g., the microprocessor) specifically programmed to interpret the first electrical parameter value and the second electrical parameter value. The controller 170 can also include algorithms or look up tables to compare the difference between the second electrical parameter value and first electrical parameter value with the predetermined threshold to determine whether the particulate filter 110 is functioning normally or has failed.

In some embodiments, the SCR system 150 included in the aftertreatment system 100 can be positioned upstream of the particulate filter 110. In still other embodiments, the aftertreatment system 100 can also include multiple branches, each branch including the particulate filter 110, the PM sensor assembly 120 and the SCR system 150. In some embodiments, the aftertreatment system 100 can also include any number of other components. Such components can include, for example an oxidation catalyst (e.g., a diesel oxidation catalyst), an exhaust reductant (e.g., a diesel exhaust fluid such as an aqueous urea solution) injector for facilitating the catalysis of the exhaust gas in the SCR system 150, a mixer for facilitating the mixing of the exhaust gas with the exhaust reductant, an ammonia oxidation catalyst, temperature sensors, NOx sensors, oxygen sensors, ammonia sensors or any other suitable components.

Figure 2:
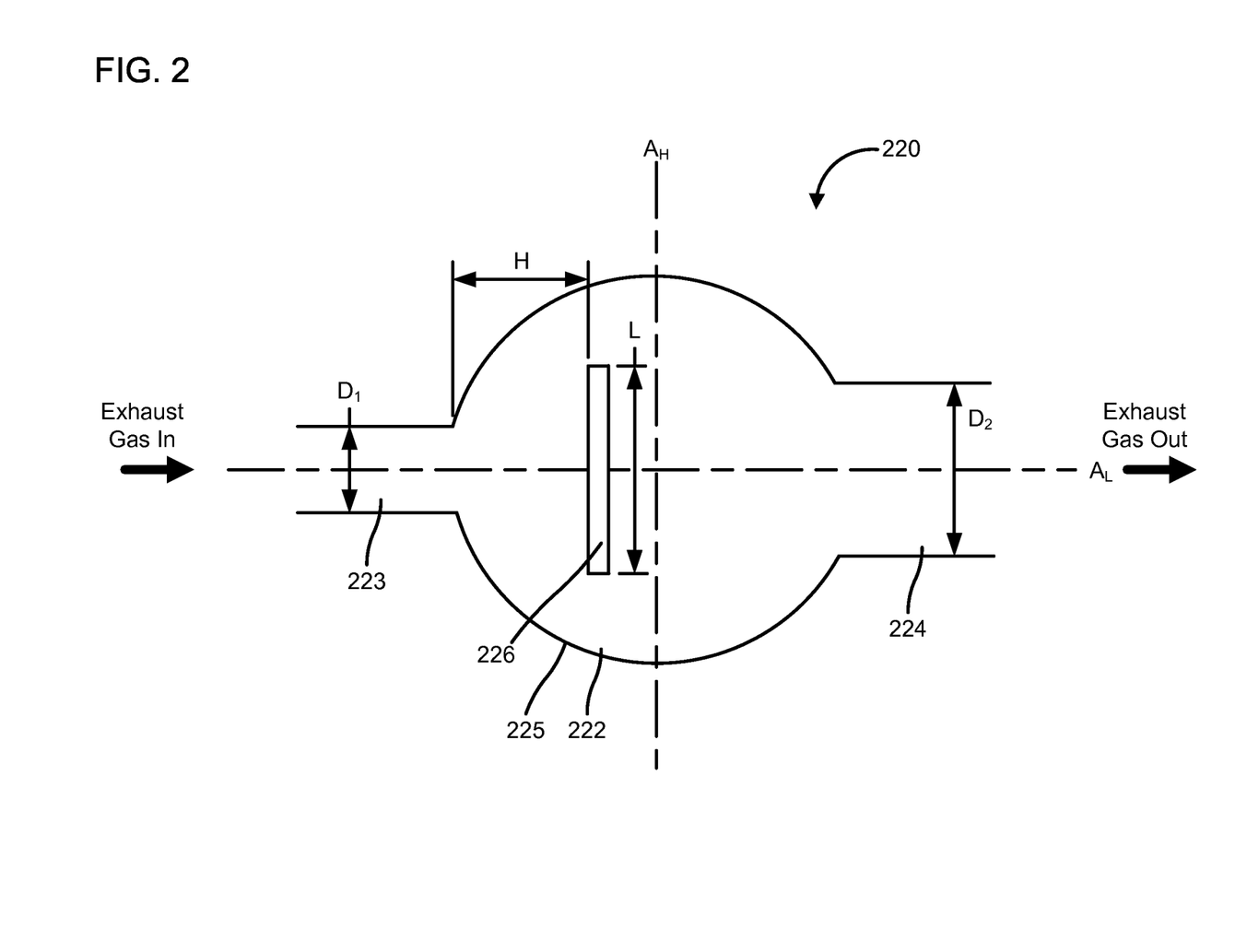
FIG. 2 is an illustration of a cross-section of one embodiment of a PM sensor assembly which can be included in the aftertreatment system of FIG. 1.

FIG. 2 is an illustration of a cross-section of a particular embodiment of a PM sensor assembly 220. The PM sensor assembly 220 can be included in an aftertreatment system (e.g., the aftertreatment system 100) and positioned downstream of a particulate filter (e.g., the particulate filter 110) included in the aftertreatment system. The PM sensor assembly 220 includes a housing 222 and a PM sensor 226.

Figure 3:
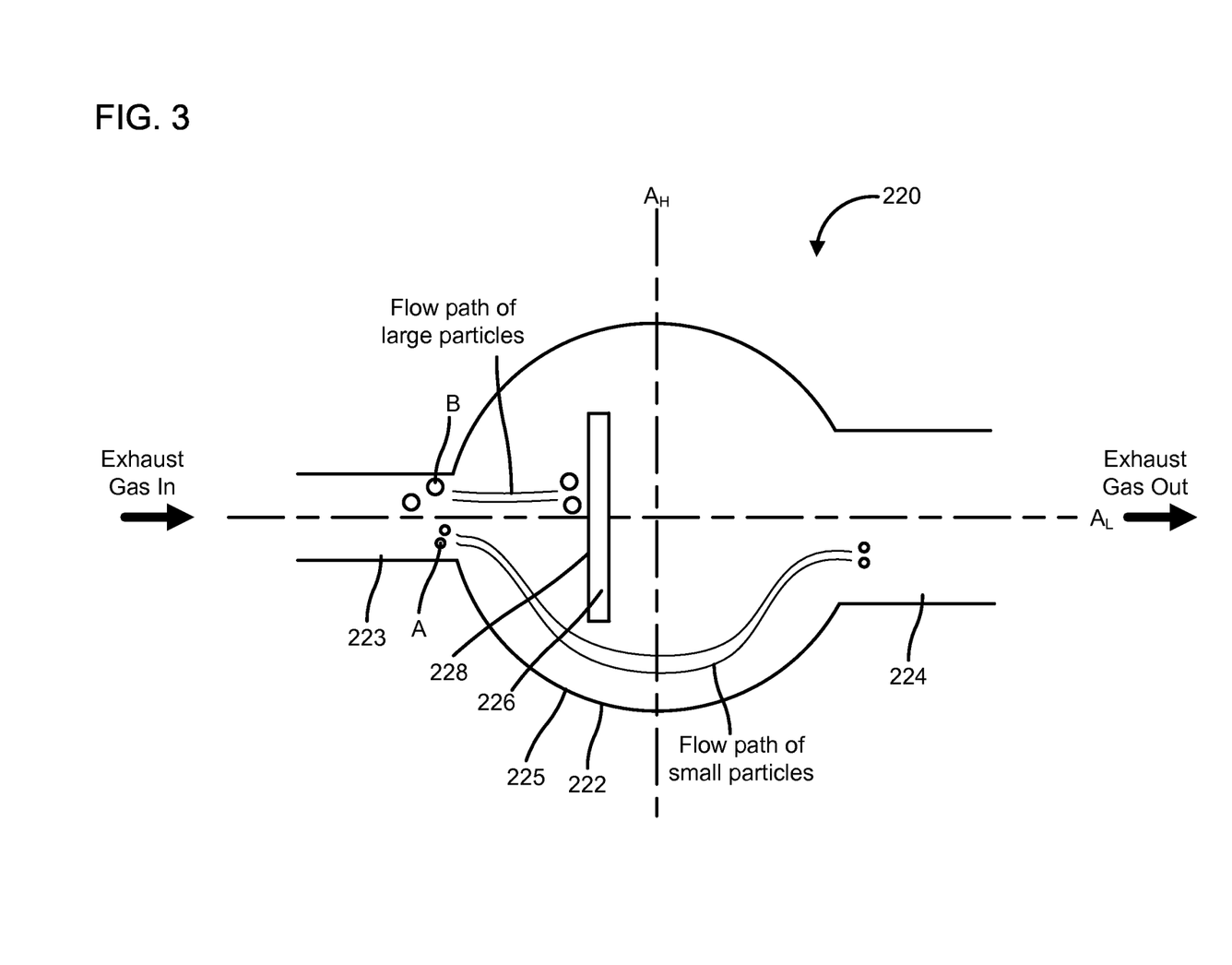
FIG. 3 is another illustration showing flow paths of small particles and large particles through a housing of the PM sensor assembly of FIG. 2.

The housing 222 has an inlet 223, an outlet 224 and a sidewall 225. The housing 222 defines an internal volume within which the PM sensor 226 is positioned. As shown in FIG. 3, the housing 222 is configured to redirect an exhaust gas flow entering through the inlet around the PM sensor 226 so that small particles included in the exhaust gas flow having a first size within or smaller than a predetermined size range (e.g., 100 nm to 300 nm) are directed around the PM sensor 226, and large particles having a second size larger than the predetermined size range impact the PM sensor 226. The predetermined size range can correspond to particles that are least effectively filtered by a particulate filter such as the filter 110.

The inlet 223 has a first cross-section $D_1$ (e.g., diameter) configured to accelerate the exhaust gas flow into the internal volume of the housing 222. The flat PM sensor 226 is positioned orthogonally with respect to a longitudinal axis $A_L$ of the PM sensor assembly 226 within the flow path of the exhaust gas. The PM sensor 226 has a length L and is positioned at a distance H from an opening of the inlet 223.

A combination of the inlet 223, and the position and orientation of the PM sensor 226 serves to change the direction of the flow of the exhaust gas in the range of 75 degrees to 90 degrees. For example, a change in pressure experienced by the exhaust gas entering the internal volume through the inlet redirects the exhaust gas around the PM sensor 226. The exhaust gas flows parallel to the PM sensor 226 and is redirected around the PM sensor 226. The sidewall 225 of the housing 222 is arcuate and is shaped to facilitate redirection of the portion of the exhaust gas around the PM sensor 226. As shown in FIGS. 2 and 3, the sidewall 225 of the housing 222 is semi-circular (or hemispherical), but in other embodiments, the sidewall 225 can be elliptical or have any other curved shape to facilitate redirection of the exhaust gas around the PM sensor 226 towards the outlet 224.

The outlet 224 has a second cross-section $D_2$ (e.g., diameter) which is larger than the first cross-section $D_1$. The larger second cross-section $D_2$ allows a less restricted flow path for the exhaust gas to exit the housing 222 to join the bulk exhaust gas flow, which can also facilitate redirection of the exhaust gas around the PM sensor 226. As the flow of the portion of the exhaust gas is redirected around the PM sensor 226, the small particles which have low inertia remain entrained within the exhaust gas flow stream and are redirected around the PM sensor 226.

Figure 4:
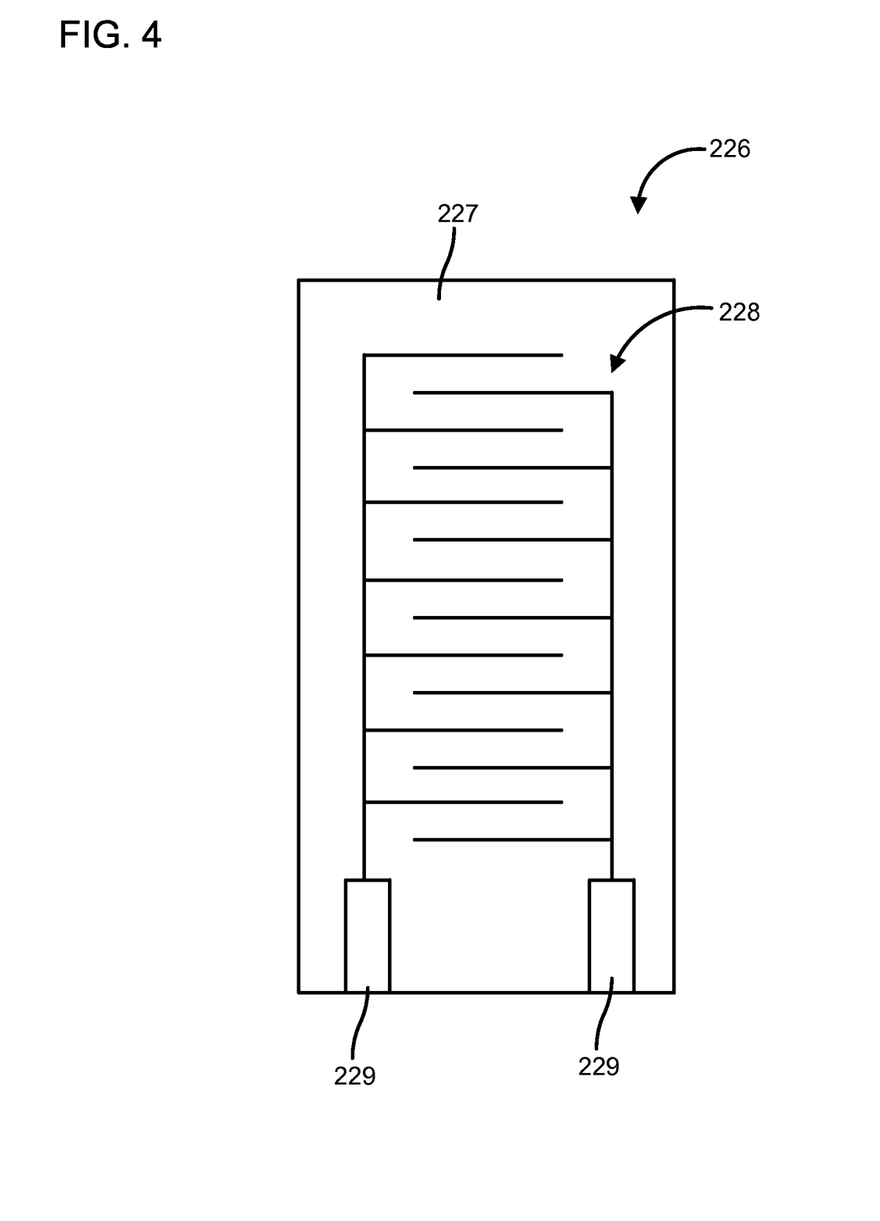
FIG. 4 is a front view of a particular embodiment of a PM sensor which can be included in the PM sensor assembly of FIGS. 1 and/or 2.

However, large particles included in the exhaust gas stream which have a higher inertia relative to the small particles leave the exhaust gas flow stream and impact the PM sensor 226, as shown in FIG. 4. As the large particles accumulate on the PM sensor 226, this causes a change in the electrical parameter value of the PM sensor 226 which is indicative of the impact and accumulation of the large particles. Since large particles are present in the exhaust stream only when the particulate filter fails as described above, impact of the large particles on the PM sensor 226 leading to change in an electrical parameter value of the PM sensor 226 also indicates that the particulate filter has failed.

The PM sensor 226 is positioned within the flow path of the exhaust gas and includes a flat sensor oriented longitudinally with respect to a longitudinal axis $A_L$ of the PM sensor assembly 220 and parallel to a vertical axis $A_V$ of the PM sensor assembly 220. For example, the PM sensor 226 can include a flat sensor that includes a first flat surface and a second flat surface opposite the first flat surface. One or more sensors can be positioned or defined on the first flat surface of the PM sensor 226.

The PM sensor 226 is positioned such that the first flat surface, which includes the one or more sensors positioned thereon, is oriented orthogonal to the longitudinal axis of the PM sensor assembly 220. For example, the first flat surface of the PM sensor 226 can be oriented at an angle of 75 degrees, 80 degrees, 85 degrees, 90 degrees, 95 degrees, 100 degrees or 105 degrees with respect to the longitudinal axis of the PM sensor assembly 220, inclusive of all ranges and values therebetween.

The one or more sensors included in the PM sensor 226 can include resistance sensors, conductance sensors and/or capacitance sensors. In particular embodiments, the one or more sensors can include interdigitated electrodes. For example, FIG. 4 shows the first flat surface of the PM sensor 226, according to one embodiment. The PM sensor 226 includes an insulating substrate 227. A pair of interdigitated electrodes 228 are positioned on the first flat surface of the insulating substrate 227. Electrical contacts 229 are also provided on the substrate 227 to allow electrical coupling of the PM sensor 226 with one or more electronic components (e.g., the controller 170).

The PM sensor 226 is configured to generate the electrical output value indicative of an electrical parameter value (e.g., a resistance value, a conductance value or a capacitance value) which changes as PM accumulates on the surface of the PM sensor 226 (e.g., the first flat surface). The change in the electrical parameter value is used to determine failure of the particulate filter, as described in further detail below.

For example, the PM sensor 226 generates a first electrical parameter value at a first time, and a second electrical parameter value at a second time after the first time (e.g., 1 minute, 2 minutes, 3 minutes, 4 minutes, 5 minutes, 6 minutes, 7 minutes, 8 minutes, 9 minutes or 10 minutes after the first time). If the difference between the second electrical parameter value and the first electrical parameter value is greater than a predetermined threshold, this provides an indication that a particulate filter (e.g., the particulate filter 110) has failed.

The first electrical parameter value is a baseline electrical parameter of the PM sensor 226, as described before herein. The second electrical parameter value occurs as a result of impact and accumulation of the large particles (e.g., having a size greater than a predetermined size range of 100 nm to 300 nm) on the PM sensor 226. The accumulation of the large particles changes the first electrical parameter value to the second electrical parameter value.

For example, the pair of interdigitated electrodes 228 are separated from each other by the insulating substrate 227. Since the substrate 227 separating the pair of interdigitated electrodes 228 is insulating, a large resistance exists between the pair of interdigitated electrodes 228. The large particles which impact and accumulate on the first flat surface of the PM sensor 226 over and between the pair of interdigitated electrodes 228. The accumulating PM accumulating on the PM sensor due to the impaction of the large particles on the first flat surface, generally have a higher conductance than the substrate.

Thus, as the large particles accumulate on the first flat surface, they create an electrical short between the pair of interdigitated electrodes 228. This lowers the resistance between the pair of interdigitated electrodes. The change in resistance is proportional to the amount of PM accumulating on the PM sensor 226. If the resistance changes from a first resistance value to a second resistance value such that a difference between the second resistance value and the first resistance value is greater than the predetermined threshold, this provides an indication that the particulate filter has failed.

Figure 5:
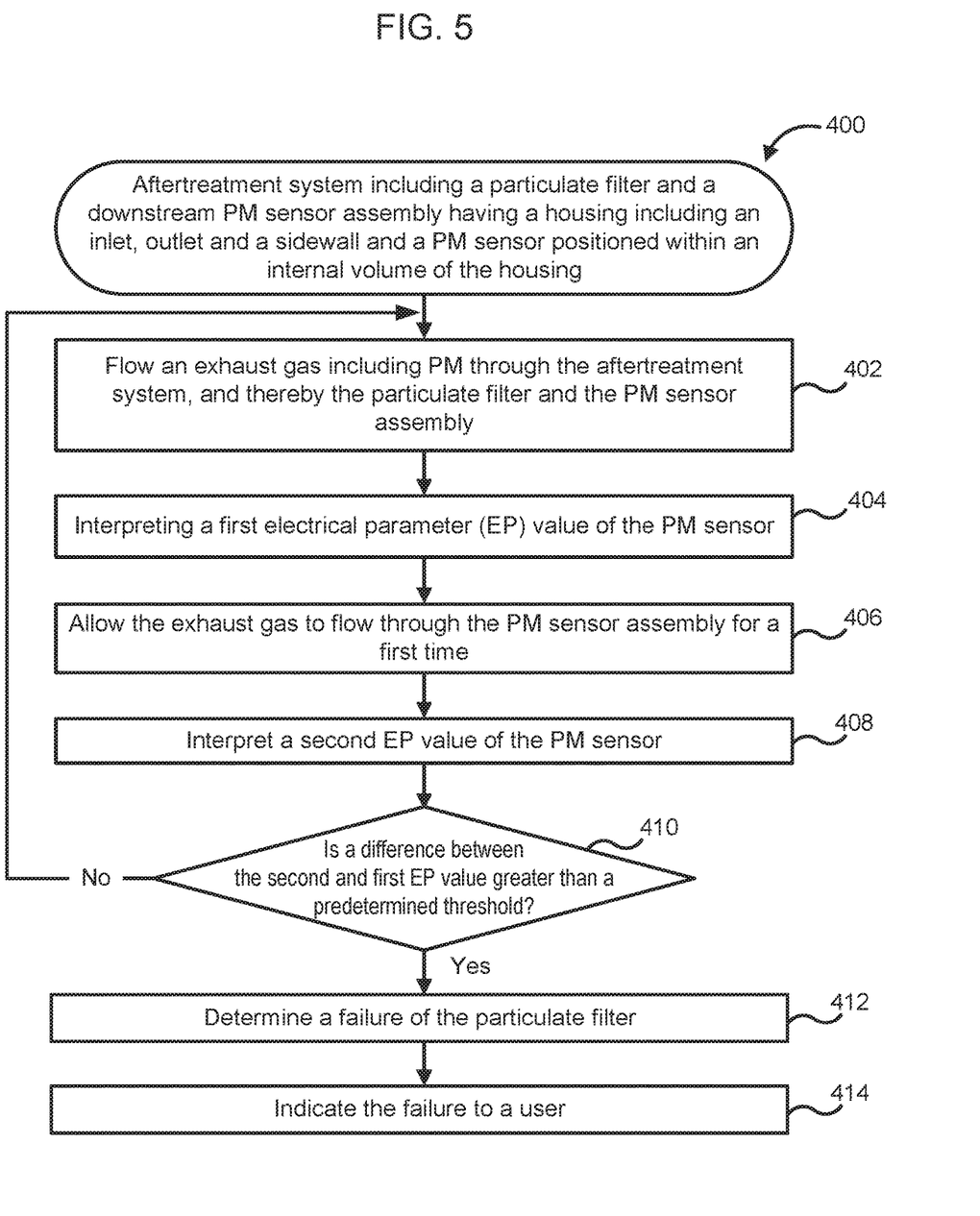
FIG. 5 is a schematic flow diagram of an embodiment of a method of detecting failure of a particulate filter using a PM sensor assembly.

FIG. 5 is a schematic flow diagram of an example method 400 for detecting a failure of a particulate filter (e.g., the particulate filter 110) included in an aftertreatment system (e.g., the aftertreatment system 100), and having a PM sensor assembly (e.g., the PM sensor assembly 120 or 220) positioned downstream of the particulate filter. The PM sensor assembly includes a housing having an inlet, outlet, and a sidewall. The housing defines an internal volume within which a PM sensor (e.g., the PM sensor 126 or 226) is positioned. The operations of the method 400 can be stored in the form of instructions on a non-transitory CRM (e.g., a main memory 536, read only memory (ROM) 538 or storage device 540 included in the computing device 530 of FIG. 6). The CRM can be included in a computing device (e.g., the computing device 530) which is configured to execute the instructions stored on the CRM to perform the operations of the method 400.

The method 400 includes flowing an exhaust gas through the aftertreatment system and thereby, the particulate filter and the PM sensor assembly at 402. A portion of the exhaust gas flows into the housing via the inlet after flowing through the particulate filter. The housing (e.g., the housing 120 or 220) is configured to redirect the flow of the portion of the exhaust gas flow around the PM sensor (e.g., the PM sensor 126 or 226) so that small particles included in the portion of the exhaust gas flow having a first size within or smaller than the predetermined size range (e.g., 100 nm to 300 nm) are directed around the PM sensor, and large particles having a second size larger than the predetermined size range impact the PM sensor.

A first electrical parameter value of the PM sensor is interpreted at 404. For example, the controller 170 interprets a first output value from the PM sensor 126 or 226 to determine the first electrical parameter value (e.g., a resistance, conductance or capacitance). The first electrical parameter value can serve as a baseline electrical parameter value as described above. The exhaust gas is allowed to flow through the PM sensor assembly for a first time at 406. For example, after interpreting the first electrical parameter value, the exhaust gas is allowed to flow through the PM sensor assembly for the first time (e.g., about 1 minute, 2 minutes, 3 minutes, 4 minutes, 5 minutes, 6 minutes, 7 minutes, 8 minutes, 9 minutes, or 10 minutes inclusive of all range and values therebetween.

A second electrical parameter value of the PM sensor is interpreted at 408. For example, the controller 170 interprets a second output value from the PM sensor 126 or 226 to determine the second electrical parameter value. The method 400 determines if a difference between the second electrical parameter value and the first electrical parameter value is greater than a predetermined threshold at 410. For example, the controller 170 can be configured to subtract the second electrical parameter value from the first electrical parameter value to obtain the difference. The controller 170 can also include look-up tables or algorithms to compare the difference with the predetermined threshold to determine if the difference is smaller or larger than the predetermined threshold.

If the difference is smaller than the predetermined threshold, the method 400 returns to operation 402. This means that the particulate filter is working properly. However, if the difference is larger than the predetermined threshold, a failure of the particulate filter is determined at 412. The failure of the particulate filter is indicated to a user at 414. For example, the controller 170 can generate a fault code or light a malfunction indication lamp.

Figure 6:
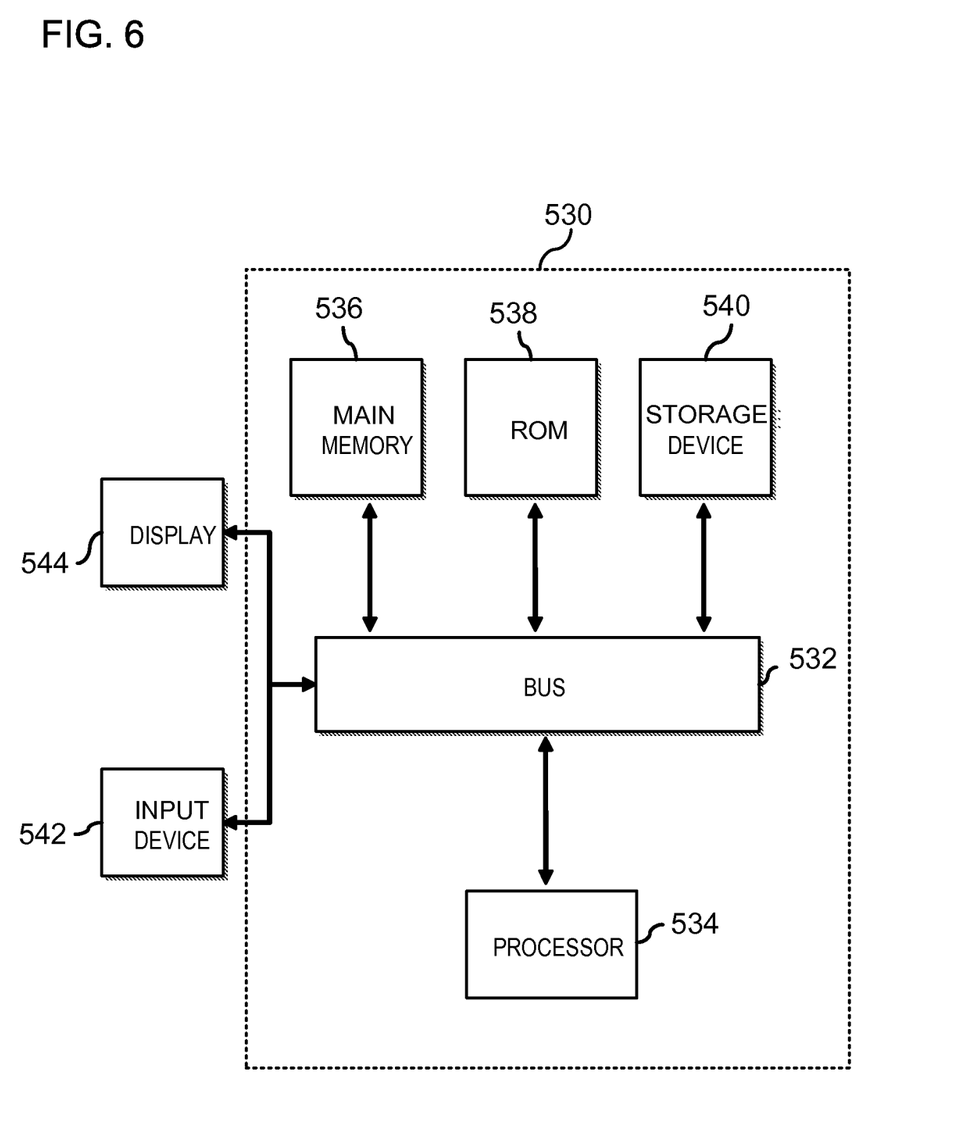
FIG. 6 is a schematic block diagram of a computing device which can be used as a controller included in the aftertreatment system of FIG. 1.

FIG. 6 is a block diagram of a computing device 530 in accordance with an illustrative implementation. The computing device 530 can be used to perform any of the methods or the processes described herein, for example the method 400. In some embodiments, the controller 170 can include the computing device 530. The computing device 530 includes a bus 532 or other communication component for communicating information. The computing device 530 can also include one or more processors 534 or processing circuits coupled to the bus for processing information.

The computing device 530 also includes main memory 536, such as a random access memory (RAM) or other dynamic storage device, coupled to the bus 532 for storing information, and instructions to be executed by the processor 534. Main memory 536 can also be used for storing position information, temporary variables, or other intermediate information during execution of instructions by the processor 534. The computing device 530 may further include a read only memory (ROM) 538 or other static storage device coupled to the bus 532 for storing static information and instructions for the processor 534. A storage device 540, such as a solid-state device, magnetic disk or optical disk, is coupled to the bus 532 for persistently storing information and instructions. For example instructions for interpreting the first electrical parameter value and the second electrical parameter value, determining a difference therebetween, and determine if the particulate filter (e.g., the particulate filter 110) has failed can be stored on the main memory 536 and/or the storage device 540. In one embodiment, the processor 534 can also be configured to generate a fault code if a difference between the second electrical parameter value and the first electrical parameter value exceeds a predetermined threshold as described above. The fault code can be stored, for example on the main memory 536 and/or the storage device 540 to be reported to a user when the computing device 530 is accessed. In other embodiments, the processor 534 can indicate to a user that the particulate filter has failed by lighting a malfunction indicator lamp (MIL), for example a MIL included in the dashboard of a vehicle.

The computing device 530 may be coupled via the bus 532 to a display 535, such as a liquid crystal display, or active matrix display, for displaying information to a user. An input device 542, such as a keyboard or alphanumeric pad, may be coupled to the bus 532 for communicating information and command selections to the processor 534. In another implementation, the input device 542 has a touch screen display 544.

According to various implementations, the processes and methods described herein can be implemented by the computing device 530 in response to the processor 534 executing an arrangement of instructions contained in main memory 536 (e.g., the operations of the method 400). Such instructions can be read into main memory 536 from another non-transitory computer-readable medium, such as the storage device 540. Execution of the arrangement of instructions contained in main memory 536 causes the computing device 530 to perform the illustrative processes described herein. One or more processors in a multi-processing arrangement may also be employed to execute the instructions contained in main memory 736. In alternative implementations, hard-wired circuitry may be used in place of or in combination with software instructions to effect illustrative implementations. Thus, implementations are not limited to any specific combination of hardware circuitry and software.

Although an example computing device has been described in FIG. 6, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various example embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
a particulate filter configured to filter particulate matter possessing a predetermined size range included in an exhaust gas flowing through the aftertreatment system;
a particulate matter sensor assembly positioned downstream of the particulate filter, the particulate matter sensor assembly including:
a housing having a single inlet, a single outlet and a sidewall, the housing defining an internal volume, and
a particulate matter sensor positioned within the internal volume, the particulate matter sensor having a first flat surface facing the inlet of the housing, the first flat surface being inclined at an angle in a range of 75 degrees to 105 degrees with respect to a longitudinal axis of the particulate matter sensor assembly, and having at least one of a resistance sensor, a conductance sensor, and/or a capacitance sensor disposed thereon; and
a controller communicatively coupled to the particular matter sensor,
wherein the particulate matter sensor assembly is positioned within a flow path of the exhaust gas so that a portion of the exhaust gas enters the internal volume of the housing via the single inlet, wherein the housing is configured to redirect the flow of the portion of the exhaust gas around the particulate matter sensor such that small particles included in the portion of the exhaust gas flow having a first size within or smaller than the predetermined size range are directed around the particulate matter sensor, and large particles having a second size larger than the predetermined size range impact the particulate matter sensor.

2. The aftertreatment system of claim 1, wherein the predetermined size range is between 100 nm to 300 nm.

3. The aftertreatment system of claim 1, wherein the single inlet has a first cross-section and the single outlet has a second cross-section larger than the first cross-section.

4. The aftertreatment system of claim 1, wherein the sidewall of the housing is arcuate.

5. The aftertreatment system of claim 1, wherein a sensing portion of the particulate matter sensor is oriented orthogonally to a longitudinal axis of the particulate matter sensor assembly.

6. The aftertreatment system of claim 1, wherein the controller is configured to:
interpret a first electrical parameter value of the particulate matter sensor;
after a predetermined time has passed, interpret a second electrical parameter value of the particulate matter sensor;
if a difference between the second electrical parameter value and the first electrical parameter value is greater than a predetermined threshold, determine that the particulate filter has failed; and
indicate the failure of the particulate filter to a user.

7. The aftertreatment system of claim 6, wherein the first electrical parameter value is a baseline electrical parameter of the particulate matter sensor, and wherein the second electrical parameter value occurs as a result of impact and accumulation of the large particles on the particulate matter sensor, the accumulation changing the first electrical parameter value to the second electrical parameter value.

8. The aftertreatment system of claim 7, wherein the first electrical parameter value and the second electrical parameter value include at least one of a resistance, conductance and capacitance.

9. The aftertreatment system of claim 8, wherein the particulate matter sensor includes interdigitated electrodes.

10. The aftertreatment system of claim 7, further comprising:
a differential pressure sensor positioned across the particulate filter,
wherein the controller is communicatively coupled to the differential pressure sensor, the controller further configured to interpret a pressure output value from the differential pressure sensor, the pressure output value indicative of a filtering efficiency of the particulate filter.

11. A particulate matter sensor assembly for use in an aftertreatment system, comprising:
a housing having a single inlet, a single outlet and a sidewall, the housing defining an internal volume; and
a particulate matter sensor positioned within the internal volume, the particulate matter sensor having a first flat surface facing the inlet of the housing, the first flat surface being inclined at an angle in a range of 75 degrees to 105 degrees with respect to a longitudinal axis of the particulate matter sensor assembly, and having at least one of a resistance sensor, a conductance sensor, and/or a capacitance sensor disposed thereon,
wherein the housing is configured to redirect an exhaust gas flow entering through the single inlet and flowing around the particulate matter sensor such that that small particles included in the exhaust gas flow having a first size within or smaller than a predetermined size range are directed around the particulate matter sensor, and large particles having a second size larger than the predetermined size range impact the particulate matter sensor.

12. The particulate matter sensor assembly of claim 11, wherein the predetermined size range is between 100 nm to 300 nm.

13. The particulate matter sensor assembly of claim 11, wherein the single inlet has a first cross-section, and the single outlet has a second cross-section larger than the first cross-section.

14. The particulate matter sensor assembly of claim 11, wherein the sidewall of the housing is arcuate.

15. The particulate matter sensor assembly of claim 11, wherein a sensing portion of the particulate matter sensor is positioned orthogonal to a longitudinal axis of the particulate matter sensor assembly.

16. The particulate matter sensor assembly of claim 11, wherein the particulate matter sensor includes an accumulating-type sensor.

17. The particulate matter sensor assembly system of claim 16, wherein the particulate matter sensor includes interdigitated electrodes.

18. A method for determining a failure of a particulate filter configured to filter particulate matter possessing a predetermined size range, the particulate filter included in an aftertreatment system having a particulate matter sensor assembly positioned downstream of the particulate filter, the particulate matter sensor assembly comprising a housing having an inlet, an outlet and a sidewall, a particulate matter sensor positioned within an internal volume defined by the housing, the particulate matter sensor having a first flat surface facing the inlet of the housing, the first flat surface being inclined at an angle in a range of 75 degrees to 105 degrees with respect to a longitudinal axis of the particulate matter sensor assembly, and having at least one of a resistance sensor, a conductance sensor, and/or a capacitance sensor disposed thereon, the method comprising:
flowing an exhaust gas through the aftertreatment system, a portion of the exhaust gas flowing into the housing via the single inlet after flowing through the particulate filter, the housing configured to redirect the flow of the portion of the exhaust gas flow around the particulate matter sensor such that small particles included in the portion of the exhaust gas flow having a first size within or smaller than the predetermined size range are directed around the particulate matter sensor, and large particles having a second size larger than the predetermined size range impact the particulate matter sensor;
interpreting a first electrical parameter value of the particulate matter sensor;

allowing the exhaust gas to flow through the particulate matter sensor assembly for a predetermined time, the predetermined time enabling the large particles to accumulate on the particulate matter sensor;

interpreting a second electrical parameter value of the particulate matter sensor;

determining if a difference between the second electrical parameter value and the first electrical parameter value is greater than a predetermined threshold;

if the difference is greater than the predetermined threshold, determining a failure of the particulate filter; and indicating the failure of the catalyst to a user.

19. The method of claim 18, wherein the first electrical parameter value is a baseline electrical parameter of the particulate matter sensor, and wherein the second electrical parameter value occurs as a result of impact and accumulation of the large particles on the particulate matter sensor, the accumulation changing the first electrical parameter value to the second electrical parameter value.

20. The method of claim 19, wherein the first electrical parameter value and the second electrical parameter value include at least one of a resistance, a conductance and a capacitance.

21. The method of claim 18, wherein the indicating comprises at least one of generating a fault code and lighting a malfunction indicator lamp.

22. The method of claim 18, wherein a sensing portion of the particulate matter sensor is positioned orthogonal to longitudinal axis of the particulate matter sensor assembly.

23. An aftertreatment system, comprising:
a particulate filter configured to filter particulate matter possessing a predetermined size range included in an exhaust gas flowing through the aftertreatment system;
a particulate matter sensor assembly positioned downstream of the particulate filter, the particulate matter sensor assembly including:
a housing having an inlet, an outlet and a sidewall, the housing defining an internal volume, and
a particulate matter sensor positioned within the internal volume, the particulate matter sensor having a first flat surface facing the inlet of the housing, the first flat surface being inclined at an angle in a range of 75 degrees to 105 degrees with respect to a longitudinal axis of the particulate matter sensor assembly, and having at least one of a resistance sensor, a conductance sensor, and/or a capacitance sensor disposed thereon; and
a controller communicatively coupled to the particular matter sensor, the controller configured to:
interpret a first electrical parameter value of the particulate matter sensor;
after a predetermined time has passed, interpret a second electrical parameter value of the particulate matter sensor;
if a difference between the second electrical parameter value and the first electrical parameter value is greater than a predetermined threshold, determine that the particulate filter has failed; and
indicate the failure of the particulate filter to a user,
wherein the particulate matter sensor assembly is positioned within a flow path of the exhaust gas so that a portion of the exhaust gas enters the internal volume of the housing via the inlet, wherein the housing is configured to redirect the flow of the portion of the exhaust gas around the particulate matter sensor such that small particles included in the portion of the exhaust gas flow having a first size within or smaller than the predetermined size range are directed around the particulate matter sensor, and large particles having a second size larger than the predetermined size range impact the particulate matter sensor.

* * * * *